UNITED STATES PATENT OFFICE.

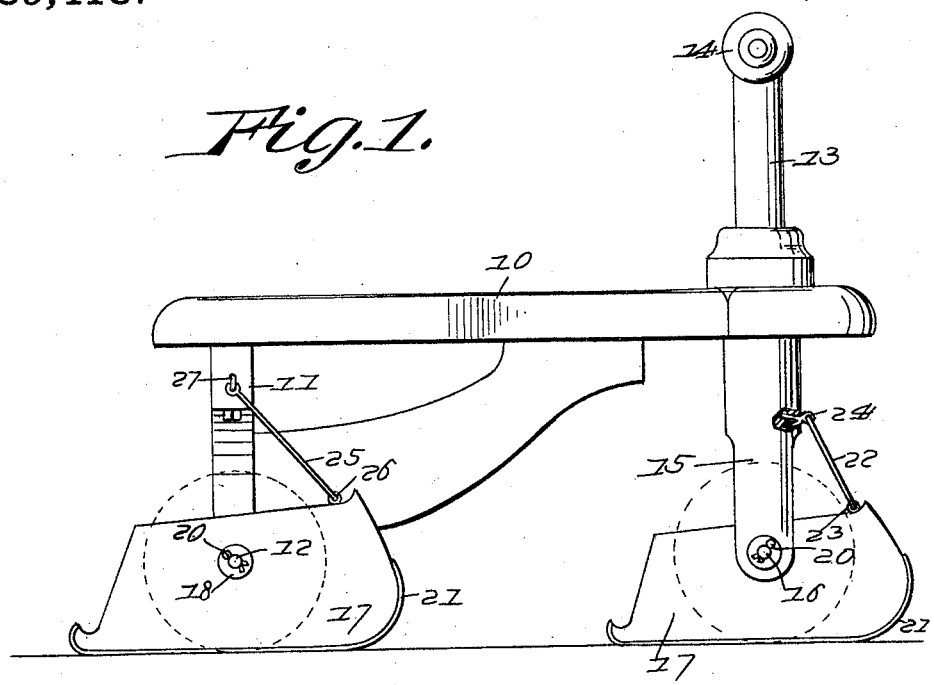
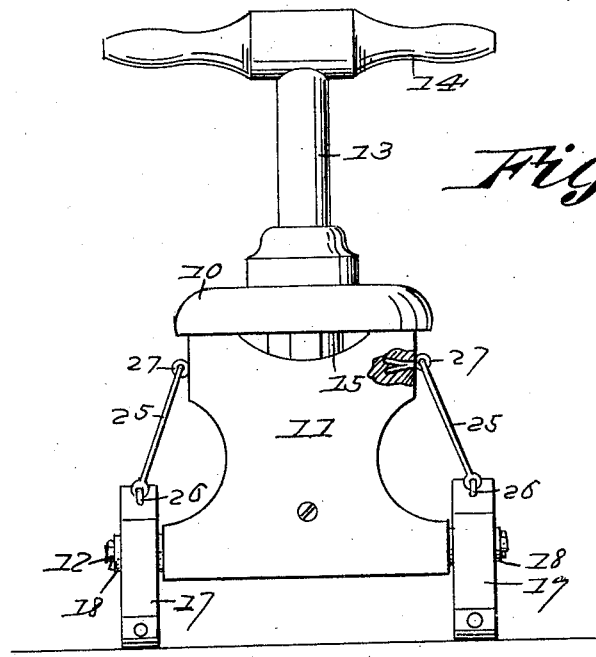

PAUL A. ARNER, OF ALLENTOWN, PENNSYLVANIA.

CHILD'S COASTER.

1,389,418.   Specification of Letters Patent.   Patented Aug. 30, 1921.

Application filed September 14, 1920. Serial No. 410,088.

*To all whom it may concern:*

Be it known that I, PAUL A. ARNER, a citizen of the United States of America, residing at Allentown, in the county of Lehigh and State of Pennsylvania, have invented new and useful Improvements in Children's Coasters, of which the following is a specification.

The object of the invention is to provide a toy, coaster or vehicle of a construction in connection with which supporting elements of a rolling and a sliding function, as for example wheels and runners, may be interchangeably used, and more particularly to provide means whereby a substantial and efficient attachment of runner elements may be afforded without involving any modification in the construction of the frame of the vehicle and without detracting from the stability of the same as a support for the rider or occupant; and with this object in view the invention consists in a construction and combination of parts of which a preferred embodiment is shown in the drawing, wherein:—

Figure 1 is a side view of the device in connection with which runners are arranged in the operative position.

Fig. 2 is a rear view of the same.

The frame of the vehicle embodies essentially the platform or seat 10 from which at its rear ends depends a hanger 11 provided with the spindles 12 and having at its front end a revoluble steering bar 13 fitted at its upper end with a handle 14 and provided below the plane of the platform or seat with a fork 15 carrying the spindle 16, said spindles being adapted as in analogous devices for the reception of wheels or rollers which serve to support the platform or seat for movement either as a coaster or otherwise under the steerage control of the bar or post 13. The runners 17 are provided with bearings for the reception of the spindles 12 and 16, and said runners are adapted to be held in place on the spindles by the usual washers 18 and cotter pins 20 or the equivalents thereof which ordinarily serve as the means for retaining supporting wheels or rollers in place on said spindles, and obviously the mounting of the single front runner between the arms of the fork 15 of the steering post adapts it to perform the function of the ordinary front steering wheel.

The runners are preferably provided with metallic shoes 21 suitable for resisting wear in traversing snow and ice, and between the forward end of each runner and the adjacent portion of the frame of the vehicle is an anchoring element which in reference to the front or steering runner is shown at 22 and consists of a strap attached at its lower end to the screw eye 23 and at its upper end to a cotter pin 24 fitted in a socket formed in the steering post. The anchors 25 for the rear runners are correspondingly constructed of straps or like means secured at their lower ends to screw eyes 26 connected at their upper ends to cotter pins 27 which are fitted in transverse sockets at the side edges of the hanger 11. These anchoring means permit of a limited rocking movement of the runners while holding them in proper position to present their lower edges for contact with the supporting surface.

It will be understood that the substitution or interchange with relation to the wheels indicated in dotted lines in Fig. 1 to the runners shown in full lines in said figure may be effected simply by removing the cotter pins 20, and that the anchoring means are connected permanently with the runners so as to be in position for the engagement of the cotter pins 24 and 27 thereof in the prescribed sockets in the steering post and hanger 11 when the runners are in use, without affording any obstructing feature which can interfere with the operation of the supporting wheels when the latter are used in place of the runners.

Having described the invention, what is claimed as new and useful is:—

A child's coaster consisting of a frame having a platform or seat, a depending rear hanger and a steering post provided at its lower end with a fork, said hanger and fork having transverse spindle portions, runners having bearings for the reception of said spindles and flexible anchoring means consisting of straps attached at their lower extremities to the forward ends of the runners and provided at their free ends with cotter pins for removable engagement with sockets in said frame.

In testimony whereof I affix my signature.

PAUL A. ARNER.